(12) United States Patent
Rafanello et al.

(10) Patent No.: US 6,636,871 B1
(45) Date of Patent: Oct. 21, 2003

(54) CONTROL OF MULTIPLE LAYER AGGREGATION LOGICAL VOLUME MANAGEMENT DATA AND BOOT RECORD

(75) Inventors: Benedict Michael Rafanello, Round Rock, TX (US); Mark A. Peloquin, Austin, TX (US); Cuong Huu Tran, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 09/616,131

(22) Filed: Jul. 13, 2000

(51) Int. Cl.$^7$ ............................................. G06F 12/00
(52) U.S. Cl. ................... 707/200; 711/162; 711/111; 711/112; 711/114; 713/1; 713/2
(58) Field of Search ................. 711/161, 162, 711/170–173; 713/1, 2; 707/200–206

(56) References Cited

U.S. PATENT DOCUMENTS

| | | | | |
|---|---|---|---|---|
| 5,790,773 | A | 8/1998 | DeKoning et al. | 395/182.04 |
| 5,796,988 | A | 8/1998 | Naidu et al. | 395/500 |
| 5,897,661 | A | 4/1999 | Baranovsky et al. | 711/170 |
| 6,192,471 | B1 * | 2/2001 | Pearce et al. | 713/2 |
| 6,366,986 | B1 * | 4/2002 | St. Pierre et al. | 711/162 |
| 6,401,183 | B1 * | 6/2002 | Rafizadeh | 711/173 |

\* cited by examiner

*Primary Examiner*—Jeffrey Gaffin
*Assistant Examiner*—Mike Nguyen
(74) *Attorney, Agent, or Firm*—Robert H. Frantz; David A. Mims, Jr.

(57) ABSTRACT

A system and method for a multi-layer logical volume management ("LVM") system which extends the single-layer logical volume model of current technology to handle multiple levels of aggregation more efficiently. Multiple levels of aggregation allows multiple types of aggregators, such as drive linking, mirroring, and software RAID, to be used together to bypass the limitations inherent in each individual aggregation technology. An LVM data area which stores information about the organization of the multi-layer logical volume is stored within the last partition of the logical volume. A fake EBR, which describes the logical volume as if it were a single disk drive, is located in the LVM data area of one of the partitions in the logical volume. A "bottom-to-top" control methodology is used to locate the LVM data area containing the fake EBR, including setting a special flag in the LVM data area containing the fake EBR. Aggregators search for this flag when creating aggregates, and set a flag in the LVM data area of the aggregate being created if any of the items being aggregated has this flag set. Thus, a path is built from the topmost aggregate to the partition containing the fake EBR. This path allows I/O requests to the EBR to be intercepted and easily redirected to the fake EBR, thereby improving the efficiency with which this is executed in comparison to previous methods.

27 Claims, 6 Drawing Sheets

*Prior Art*

CONTROL OF MULTIPLE LAYER AGGREGATION LOGICAL VOLUME MANAGEMENT DATA AND BOOT RECORD

CROSS-REFERENCE TO RELATED APPLICATIONS

This application is related to U.S. application Ser. No. 09/561,184, filed Apr. 27, 2000, by Benedict Michael Rafanello, et al, which is commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

The related application, Ser. No. 09/561,184, filed on Apr. 27, 2000. Benedict Micheal Rafanello, et al, is incorporated herein by reference in its entirely, including drawings, and hereby is made a part of this application.

BACKGROUND OF THE INVENTION

1. Field of the Invention

This invention relates in the arts of computer disk media, formating of computer disks, organization of computer readable media by operating systems and device drivers, and the management of logical volumes of computer disks. In particular, this invention relates to improvements to the control of data and boot records stored in logical volumes when the logical volumes comprise multiple layers of aggregation.

2. Description of the Related Art

Persistent and mass data storage devices for computer systems, especially those employed in personal computers, are well known within the art. Many are disk-based, such as floppy disks, removable hard disk drives ("HDD"), and compact-disk read only memories ("CD-ROM"). FIG. 1 shows a typical personal computer system (1) architecture, wherein a CPU (2) interfaces to a variety of I/O devices such as a keyboard (3), monitor or display (5) and a mouse (4). The CPU (2) also may interface to a number of storage peripherals including CD-ROM drives (7), hard disk drives (6), and floppy drives (5). Typically, floppy disk drives interface to the CPU via Integrated Drive Electronics ("IDE") (8), but this interface may alternately be one of several other standard interfaces or a proprietary interface. The hard disk drives (6) and CD-ROM drives (7) may interface to the CPU (2) via an IDE or Small Computer System Interface ("SCSI"), as shown (9).

FIG. 2 shows a generalization of the hardware, firmware and software organization of a personal computer system (20). The hardware group (21) includes the persistent storage devices discussed supra, as well as other system hardware components such as a real-time clock, keyboard controller, display adapter, etc. A basic input/output system ("BIOS") (22) provides the direct firmware control of these system components typically. An operating system (24) such as the IBM OS/2 operating system provides high level management of the system resources, including the multi-tasking or multi-threaded scheduling and prioritization of the system application programs (25). Drivers (23) provide specific high-level interface and control functions for specific hardware, such as a manufacturer and model-specific LAN interface card driver or CD-Rewritable ("CD-RW") driver. This generalized view of the system also applies to systems on alternate, non-IBM-compatible platforms, such as workstations, which employ a variety of operating systems such as Microsoft Windows, UNIX or LINUX. This general organization of computer system resources and software functionality is well understood in the art.

Turning to FIG. 3, disk-based mass storage devices such as hard disk drives, floppy disks and CD-ROMS are based physically on a rotating storage platter (30). This platter may be made of flexible mylar, such as floppy disks, or more rigid platters made of aluminum, glass or plastic, such as hard disk drives and CD-ROMS. For magnetic media, one or both sides of the platter are coated with a magnetic layer capable of recording magnetic pulses from a read/write head. For optical media, data recording is made using changes in reflectivity of a band of light, which is then read by a laser-based head. Writable and Re-writable CD-ROM drives combine the technologies of magnetic disks and optical disks. In general, though, the organization of data on the disk is similar. The disk surfaces are divided into multiple concentric rings, or tracks (31). Some disk drives, such as hard disk drives, consist of multiple platters, in which case corresponding tracks on each platter are grouped into cylinders. Each track is divided into multiple sectors (32) in which data can be stored.

Turning to FIG. 4, we see a computer disk drive (41) represented as an ordered collection of sectors numbered 0 through "n". The very first sector on the hard drive, sector zero, contains the Master Boot Record ("MBR"). The MBR contains partition definitions for the rest of the disk. TABLE 1 shows a sample partial MBR.

TABLE 1

| Partition Table for 6 GB Drive | | | |
|---|---|---|---|
| Partition | Start (cyl, side, sector) | End (cyl, side, sector) | Length (sectors) |
| first | 0, 1, 1 | 391, 254, 63 | 6297417 |
| second | 392, 0, 1 | 783, 254, 63 | 6297480 |

For the disk partitioning shown in TABLE 1, the MBR is located in the first sector on side 0 at cylinder 0 sector 1. The MBR requires only one sector, but the entire track of 63 sectors is "blocked" for the use of the MBR, 62 sectors of side 0 cylinder 0 are left unused.

The partition table has entries in it defining two types of partitions: primary and extended. Conventional disk formatting schemes allow only one extended partition (411) to be defined. P1 (43) and P2 (44) are primary partitions. The order and locations of the primary and extended partitions may vary, but invariably there are entries in the partition table of the MBR which defines them.

The extended partition (411) is defined in the partition table in the MBR as a single partition using a single entry in the MBR partition table. Basically, this entry in the MBR just indicates to the computer operating system that inside of this extended partition can be found other partitions and partition definitions. The operating system typically assigns logical drive letters and/or logical volumes to these partitions, or groups of partitions.

In order to determine the size and location of the partitions within the extended partition, the operating system accesses the first sector of the extended partition which typically contains another boot record, known as an Extended Boot Record ("EBR"). The format of the EBR is similar to that of the MBR, and is also well known in the art.

FIG. 4 shows a first EBR (45), a second EBR (47), and a third EBR (49) within the extended partition (411). In practice, there may be fewer or more EBR's within an extended partition.

Each EBR contains a partition table similar to a MBR partition table. Conventionally for computer drives commonly used in personal computers and workstations, only two entries may be in use in each EBR. One entry will define a logical partition, and the second entry acts as a link, or pointer, to the next EBR. FIG. 4 shows a pointer (412) from the second entry of the first EBR (45) to the beginning of the second EBR (47), and a similar pointer (413) from the second entry of the second EBR (47) to the beginning of the third EBR (413). The last EBR in the extended partition does not contain a pointer to a subsequent EBR, which indicates to the operating system that it is the last EBR in the extended partition. In this manner, the operating system can find and locate the definitions for an unlimited number of partitions or logical drives within the extended partition on a deterministic basis.

In each partition table entry, whether it be an EBR or an MBR, there are certain fields which indicate to the operating system the format, or file system, employed on the disk. For example, for DOS ("disk operating system") systems, the field may indicate that the file system is File Allocation Table ("FAT") formatted. Or, for systems which are running IBM's OS/2 operating system, the entry may indicate that the file system is High Performance File System ("HPFS") formatted. There are a number of well-known file system formats in the industry, usually associated with the common operating systems for computers such as Microsoft's Windows, IBM's OS/2 and AIX, variants of UNIX, and LINUX. Using this field, the operating system may determine how to find and access data files stored within the partitions of the primary and extended partitions on the computer disk. The file system format indicator is sometimes called the "system indicator".

IBM's OS/2 operating system includes a function referred to as the Logical Volume Manager, or "LVM". For systems without an LVM, each of the partitions that is usable by the operating system is assigned a drive letter, such as "C:" or "F:", producing a correlating drive letter for each partition on a disk in the computer system. The process which assigns these letters is commonly known. For systems with an LVM, a drive letter may be mapped instead to a logical volume which may contain one or more partitions. The process by which partitions are combined into a single entity is known generically as "aggregation." Given the highly modular design of the OS/2 LVM, the functionality which performs aggregation is contained completely within a single module of the LVM program. LVM calls any module which performs aggregation an "aggregator".

There are various forms of aggregation, such as drive linking, mirroring, and software Redundant Array of Independent Disks ("RAID"). The OS/2 LVM allows a single level of aggregation through the use of drive linking. Internally, the OS/2 LVM uses a layered model. Each feature offered by the LVM for use on a volume is a layer in the LVM. The input to a layer has the same form and structure as the output from a layer. The layers being used on a volume form a stack, and I/O requests are processed from the top most layer down the stack to the bottom most layer. Currently, the bottom most layer is a special layer called the pass through layer. The top most layer is always the aggregator, which, in the current implementation, is always the drive linking layer. All of the layers in the middle of the stack represent non-aggregation features, such as Bad Block Relocation.

FIG. 5 illustrates the relationship of the layered model of the LVM and the aggregation of physical partitions into a logical volume (90). On the left, the "feature stack" is shown, having a "pass through" layer (97) at the bottom which interfaces directly to the disk devices or device drivers. Above the "pass through" layer (97) may be a feature (96), such as Bad Block Relocation ("BBR"). Above the feature may be a layer of aggregation, such as drive linking (95). From the view of the feature stack model, an I/O request (98) is received at the top of the stack and propagated downwards to the pass through layer. Comparing that to a tree model of a logical volume (90), the aggregator Al (91) corresponds to the a aggregation layer (95), the feature layer (96) corresponds to the three interfaces between the aggregator Al (91) and it's partition definitions P1, P2, and P3 (92, 93, and 94 respectively), and the pass through layer (97) corresponds to the interfaces between the partition definitions and the actual devices or device drivers. These types of LVM structures, feature stack models, and tree models are well understood in the art, and the models can be equally well applied to logical volume management systems in other operating systems such as Hewlett Packard's HP-UX and IBM's AIX.

Partitions which are part of a logical volume have a special filesystem format indicator. This indicator does not correspond to any existing filesystem, and it serves to identify the partitions as belonging to a logical volume. The actual filesystem format indicator for a logical volume is stored elsewhere. Furthermore, partitions belonging to a volume have an LVM Data Area at the end of each partition in the volume. The data stored in the LVM Data Area allows the LVM to re-create the volume every time the system is booted. Thus, the LVM allows groupings of partitions to appear to the operating system as a single entity with a single drive letter assignment.

In previous versions of the OS/2 operating system, a file system utility such as the FORMAT disk utility would access the partition table for the partition that was being formatted through low level Input/Output Control ("IOCTL") functions. The system provides IOCTL's to allow a software application to directly read and write to the computer disk, bypassing the file system, rather than using filed-based operations.

Using the IOCTL functions, an application program can actually access everything from the EBR that defines the partition being processed to the end of the partition itself. This allows disk utilities to find the partition table entry that corresponds to the partition they are processing, and alter it. For example, FORMAT will update the filesystem format indicator in the partition table entry for each partition that it formats successfully. While this method works fine for processing individual partitions, it creates problems when dealing with logical volumes. Logical volumes appear to the system as a single entity, which means that they will look just like a partition to older disk utilities, which will naturally try to treat them as such. However, since a logical volume may contain more than one partition, there is no EBR or partition table entry which describes it. If the older disk utilities are allowed to access the EBR or partition table entry for one of the partitions contained within the logical volume, the partition described in the partition table entry will not agree with what the disk utility sees as the partition. Furthermore, if the disk utility alters the partition table entry, such as when FORMAT updates the filesystem format indicator, the resulting partition table entry will not be correct. Thus, older disk utilities must not be allowed to access the EBR or partition table entry for a partition contained within a logical volume, yet they need an EBR and partition table entry in order to function correctly.

In the first version of the OS/2 LVM, this problem was solved by creating a "fake" EBR which contained a "fake" partition table entry that described the entire logical volume as if it were a single partition. This "fake" EBR was stored inside of the logical volume on the first partition in the logical volume. The IOCTL functions were intercepted and any requests for an EBR were redirected to the "fake" EBR. This allowed logical volumes to be treated as partitions by older disk utilities, thereby allowing them to function.

The currently available OS/2 LVM design supports only a single layer of aggregation. This places some limitations on what can be done. For example, if software RAID is used as the aggregator, then there is a limit on the number of partitions that can be aggregated into a single volume. However, if multiple levels of aggregation are allowed, then drive linking could be used to aggregate several software RAID aggregates into a volume, thereby providing a volume with all the benefits of software RAID without the limitations of software RAID.

The improved LVM described in the related application provides for multiple layers of aggregation. However, the location of the fake EBR is found by the system software using a broadcast method. According to the broadcast method, when an I/O request to the EBR is detected by the multilevel LVM, each aggregator which does not find the "fake" EBR among its children duplicates the I/O request, flags it as an EBR I/O request, and issues the I/O request to each of its children in parallel simultaneously. This parallel duplication and issuance of I/O requests may descend multiple levels of aggregation. Of all the parallel requests, only one will succeed and the others will be discarded. When an aggregator finds the "fake" EBR among its children, it will redirect the I/O request to the "fake" EBR, and turnoff the EBR I/O request flag. When an I/O request reaches the pass through layer, if the EBR I/O request flag is set, the pass through layer will discard that I/O request. Thus, only one I/O request will succeed in reaching the "fake" EBR, and all of the duplicate I/O requests generated along the way will be discarded.

The broadcast method disclosed in the related application is relatively simple to implement, and, since I/O requests to the EBR are rare, it is reasonably efficient in many applications. An alternative to issuing the duplicate EBR I/O requests in parallel is to issue them in serial, stopping with the first one to succeed. In this case the pass through layer will fail any I/O request which has the EBR I/O flag set instead of discarding such requests.

However, the broadcast method may not meet the system requirements for systems in which the logical volumes are managed heavily, i.e., the fake EBR is accessed often. Because the broadcast method causes many replications of the I/O request from parents to children, the processing time or bandwidth required to process all of the replicated requests may become detrimental to system performance.

Thus, there exists a need in the art for a multi-layer logical volume management system and method which allows for multiple levels of aggregation and allows for deterministic, efficient location and access of the LVM data area containing the fake EBR.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The system and method for control of data and boot records associated with multi-layer logical volumes allows the logical volume data area containing the fake EBR to be deterministically and efficiently accessed by using a "bottom-to-top flag" control methodology. According to this method, the fake EBR is stored in the LVM data area of a partition belonging to the volume that the fake EBR describes. This LVM data area will have a flag set (the EBR_PRESENT flag) to indicate that it contains the fake EBR. Aggregators will check for this flag among the partitions being aggregated, and, if found, will set the EBR_PRESENT flag in the LVM data area of the aggregate being created. When an I/O request to the EBR is detected by the topmost aggregator, it will scan the children of the topmost aggregate to see which one has the EBR_PRESENT flag set in its LVM data area, it will mark the I/O request as an EBR I/O request, and then direct the I/O request to that child. Any other aggregators which may be encountered will see that the I/O request is an EBR I/O request, and they will automatically direct the I/O request to which ever of their children has the EBR_PRESENT flag set. Thus, the I/O request is propagated down through the multiple aggregation layers of the volume until it reaches the partition containing the fake EBR, at which point the I/O request will be fulfilled using the fake EBR instead of the real EBR.

BRIEF DESCRIPTION OF THE DRAWINGS

The following detailed description when taken in conjunction with the figures presented herein present a complete description of the present invention.

DETAILED DESCRIPTION OF THE INVENTION

Figure 1:
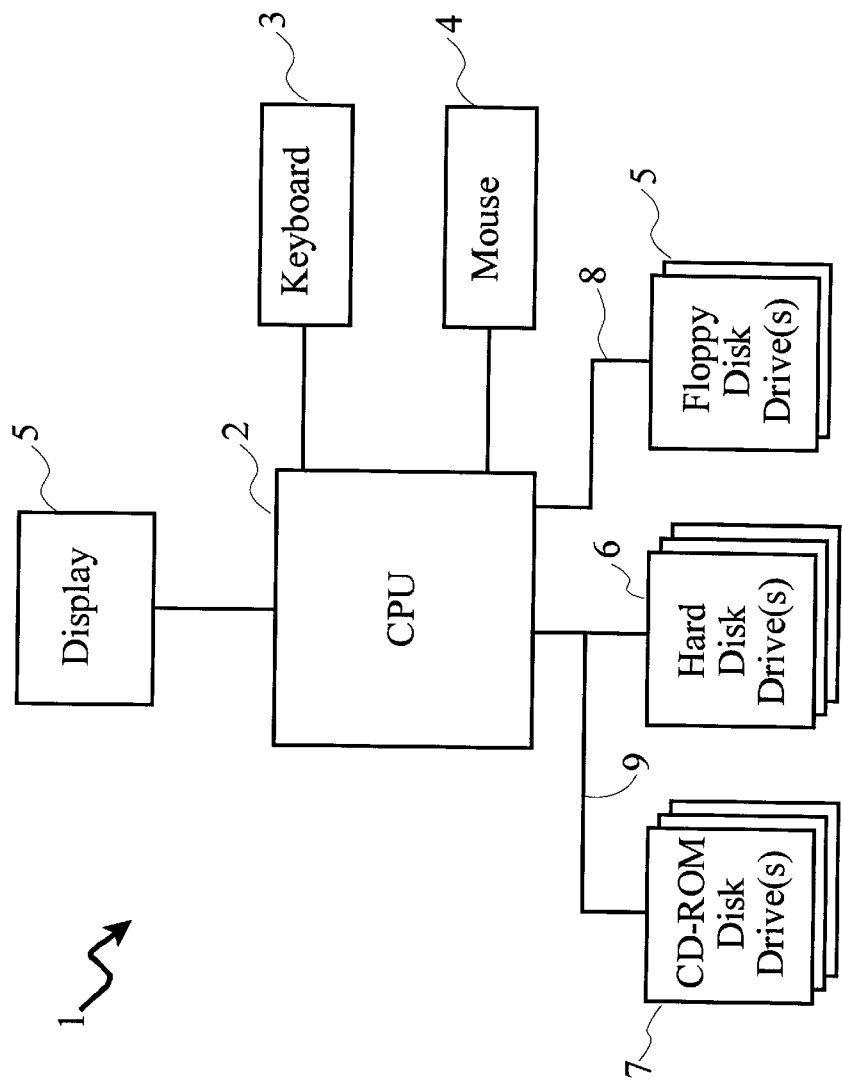
FIG. 1 discloses the fundamental hardware architecture of a computer such as a personal computer.
Figure 2:
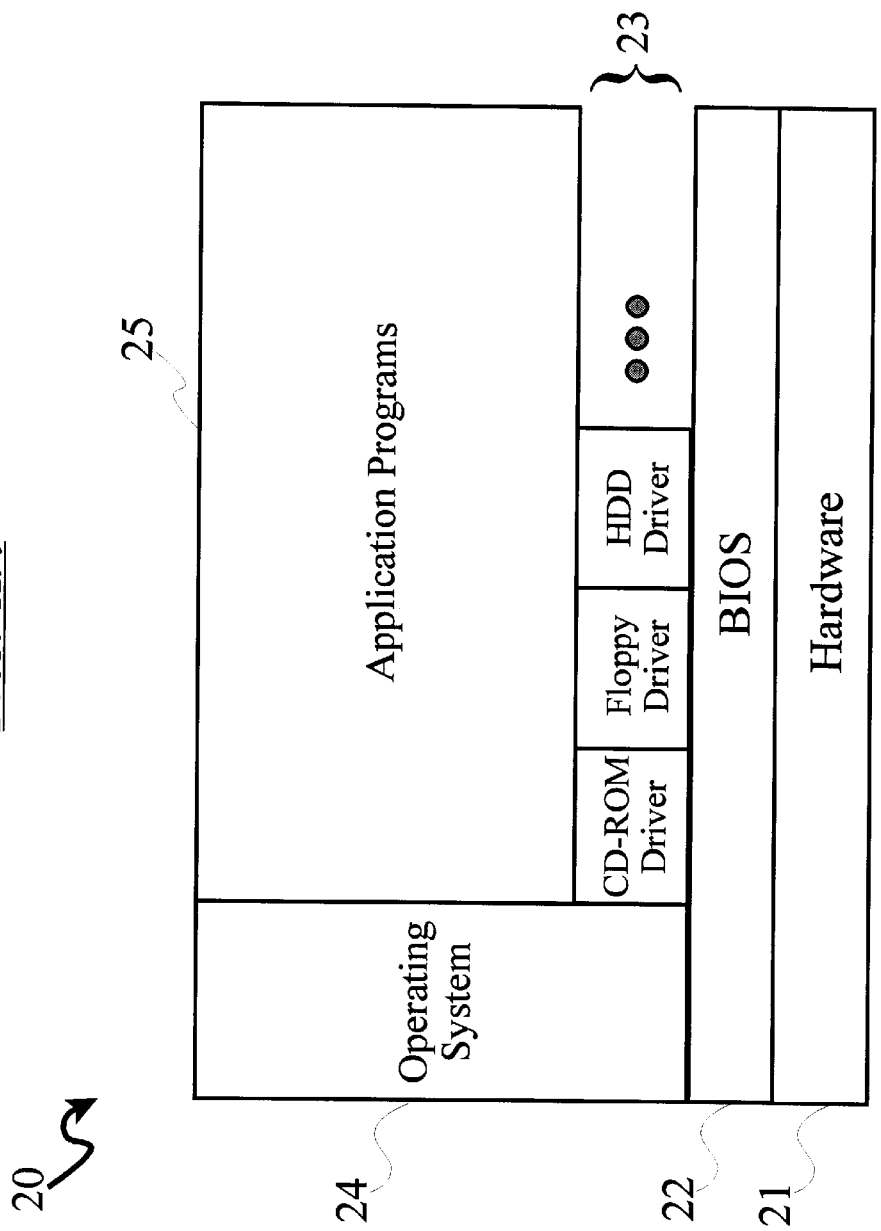
FIG. 2 discloses the fundamental software architecture of such a computer.
Figure 3:
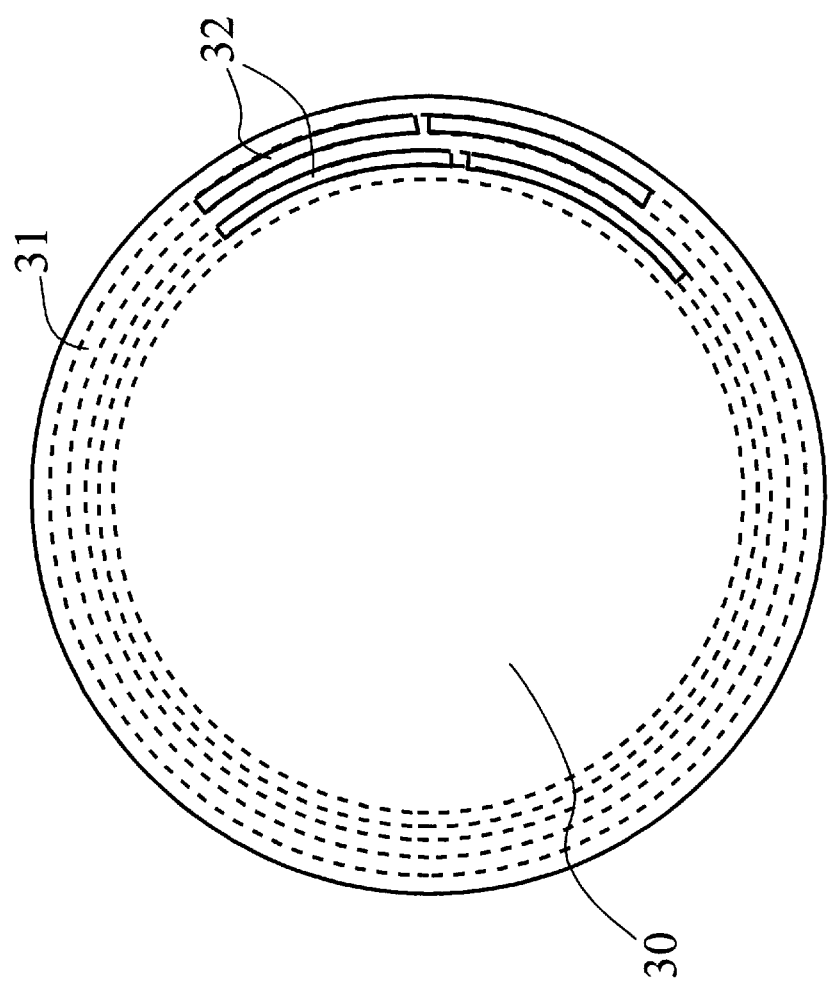
FIG. 3 illustrates the nature of formatting computer disk surfaces into tracks.
Figure 4:
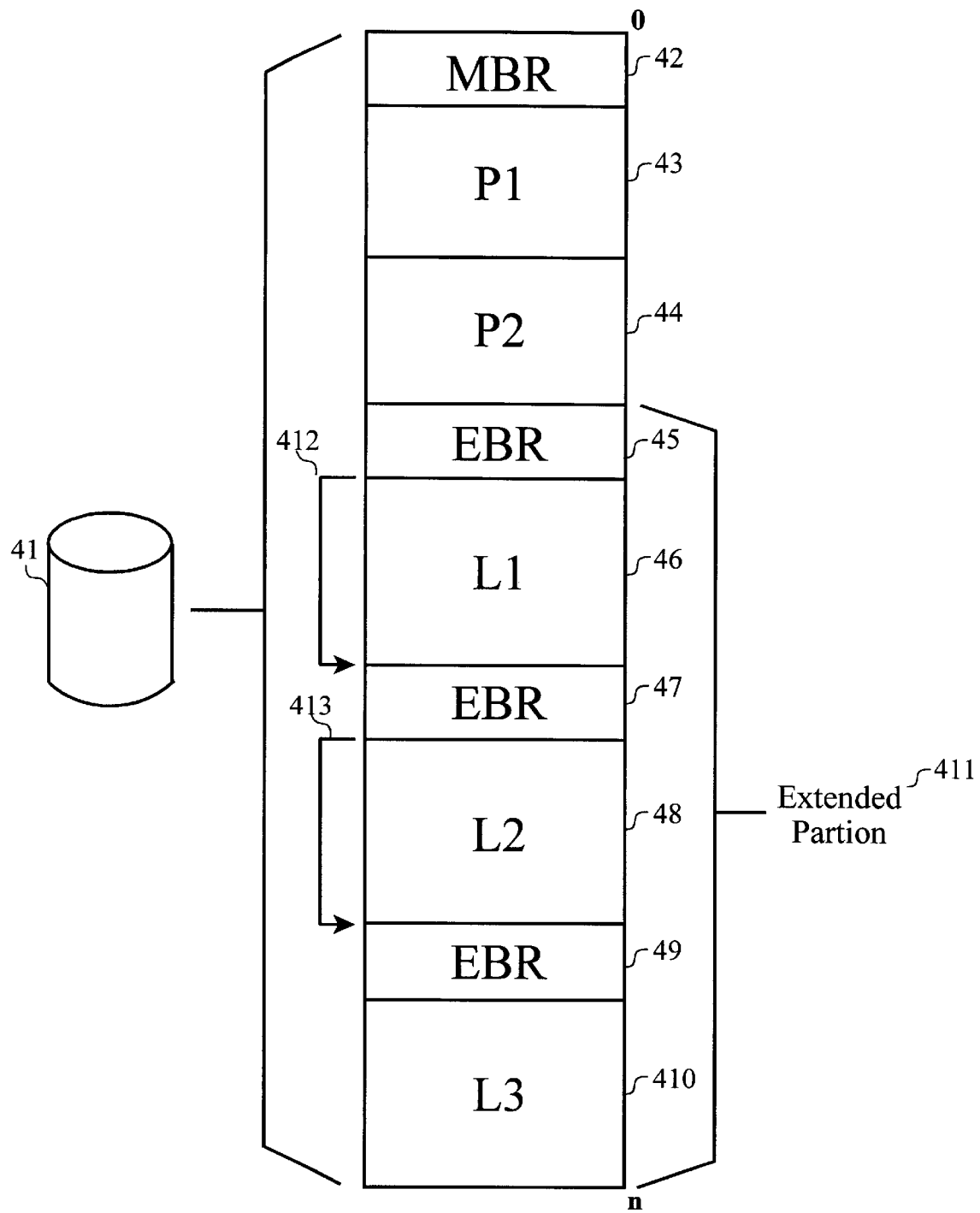
FIG. 4 shows the organization of the disk sectors into boot records and partitions.
Figure 5:
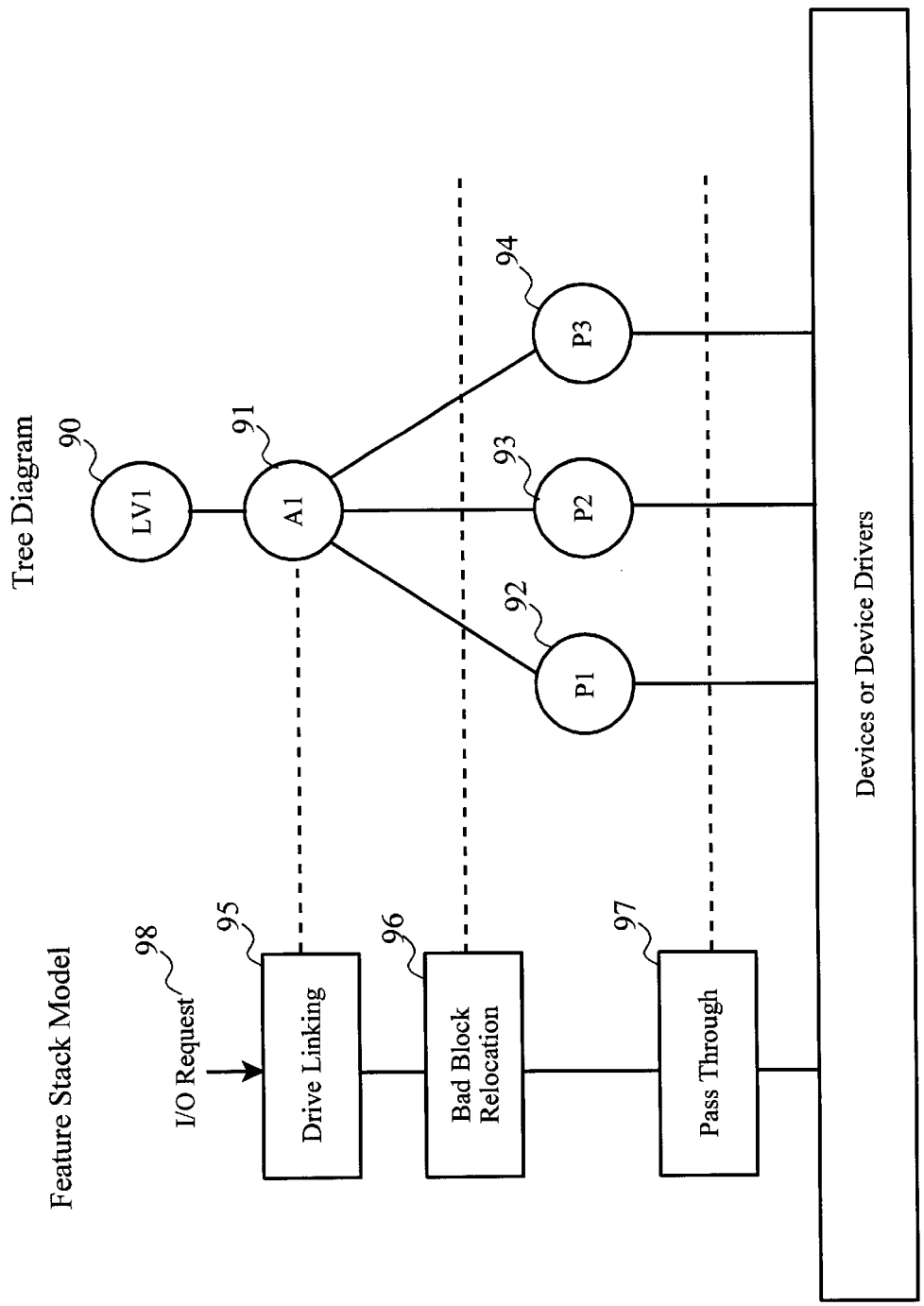
FIG. 5 depicts the relationship between a feature stack model of a LVM and a tree model of an LVM.

The invention is preferably realized using a well-known computing platform, such as an IBM personal computer, running the IBM OS/2 operating system. However, it may be realized in other popular computer system platforms, such as a Sun Microsystems or IBM RS/6000 workstation, running alternate operating systems such as Microsoft Windows, HP-UX, UNIX or LINUX, without departing from the spirit and scope of the invention.

By using OS/2 as the operating system of the preferred embodiment, the existing OS/2 Logical Volume Manager ("LVM") which was previously described in the "Background of the Invention" and in the related application can be modified to realize the invention.

The existing OS/2 LVM provides a single-layer of aggregation, called the drive linking layer, and a system for creating and managing logical volumes. It employs a layered model, where each feature or function available for use on a volume is a separate module whose inputs and outputs are the same in form and structure. The features applied to a volume form a stack, with the aggregator (drive linking) being the topmost layer in the stack, and the special pass through layer being the bottom layer of the stack. When a volume is being created (or re-created after a system boot), the feature stack is built from the bottom up, beginning with the pass through layer. Once all of the volumes have been created and are ready for use, the LVM must begin to process I/O requests against the volumes in the system. When an I/O request is processed, it is processed from the top of the stack, down through the layers (the output of one layer is the input to the next), to the bottom of the feature stack where it is then sent on to the device(s).

Creation and Structure of Multi-Layer Logical Volumes

The existing OS/2 LVM is further modified according to the related application to realize an LVM with multiple-levels of aggregation. However, the method for storing and finding the LVM data area and the fake EBR as described in the related application is supplemented, replaced, or augmented by the method described herein.

When a volume is being created (or re-created after a reboot), an LVM data area is stored (or found after a reboot) at the end of each actual partition. During volume creation (or modification), the fake EBR is stored in the LVM data area of one of the partitions in the logical volume. A flag, the EBR_PRESENT flag, is set in this LVM data area to indicate that it contains the fake EBR for the volume. An aggregator, when creating an aggregate, will check the EBR_PRESENT flag in the LVM data areas of each of the items (partitions/aggregates) being aggregated and, if it finds the EBR_PRESENT flag set on any of the items being aggregated, it will set the EBR_PRESENT flag in the LVM data area of the aggregate being created. Thus, a path is built from the bottom up between the partition containing the fake EBR to the topmost aggregate of the volume. Each step in this path is identified by the EBR_PRESENT flag being set in its LVM data area.

An I/O request to the EBR results in the I/O request being redirected to the fake EBR stored in the LVM data area of one of the partitions in the volume. When the topmost aggregator encounters an I/O request to the EBR, it will search the children of the topmost aggregate to see which one has its EBR_PRESENT flag set. Once found, the topmost aggregator will mark the I/O request as being an EBR I/O request, and then it will redirect the I/O request to that child whose EBR_PRESENT flag is set. If an aggregator other than the topmost aggregator encounters an I/O request marked as an EBR I/O request, it will forward the I/O request to the child of its aggregate which has its EBR_PRESENT flag set. In this fashion, the I/O request will be propagated down through the layers of the volume until it reaches the partition containing the fake EBR, where the I/O request will be carried out against the fake EBR.

Bottom-to-Top Flag Method of I/O Request Handling

Figure 6:
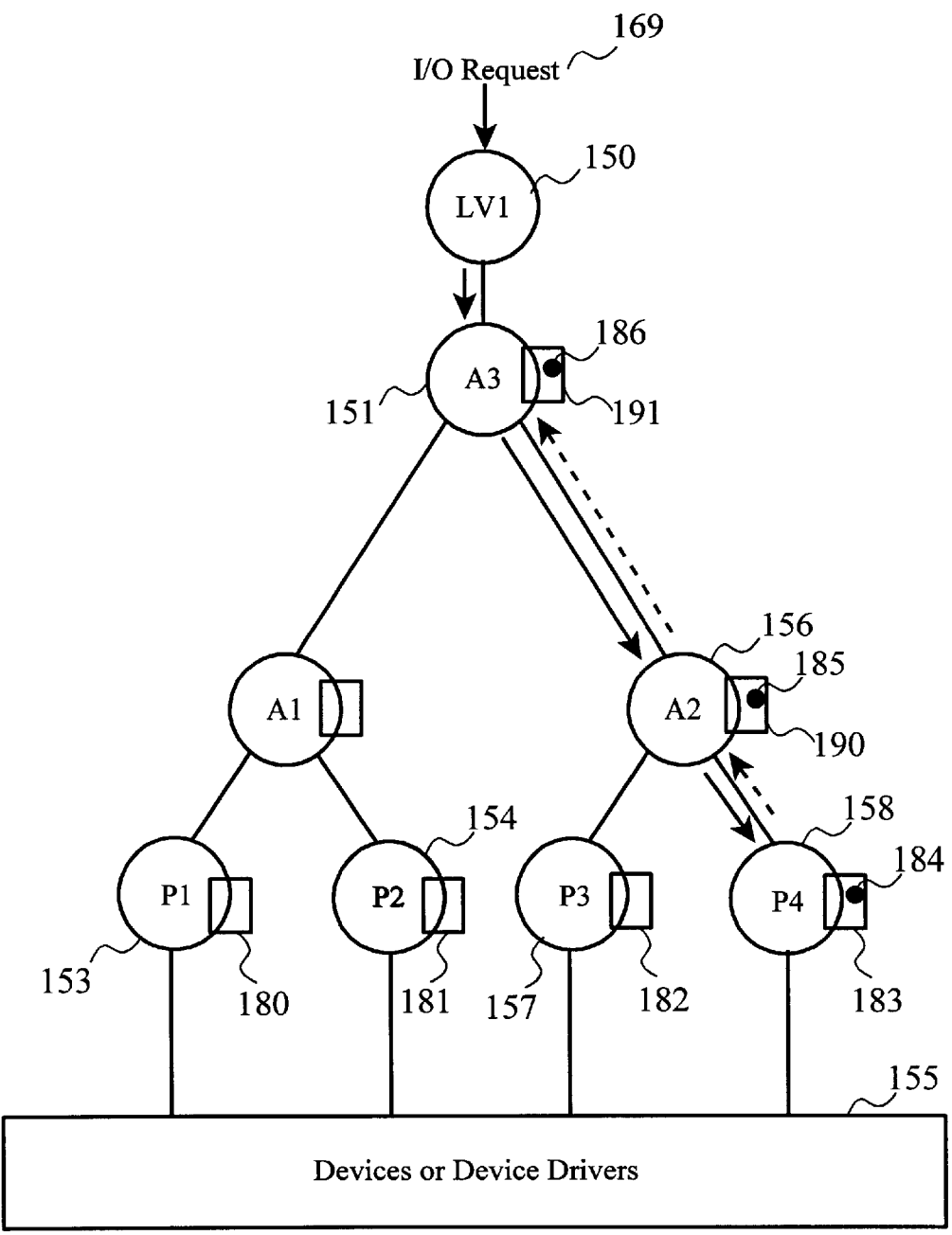
FIG. 6 graphically discloses the bottom-to-top flag method employed by the multi-layer LVM to locate the LVM data area.

The process of the "bottom-to-top flag" method of handling I/O requests is shown in FIG. 6. Upon initialization or creation of the multi-layer logical volume LV1 (150), each level of aggregation, beginning with the bottom most layer and proceeding to the topmost layer, will have its aggregators check for the EBR_PRESENT flag in the LVM data area of the children of their respective aggregates. Thus, in the example shown in FIG. 6, aggregators A1 and A2 check for the EBR_PRESENT flag within the LVM data areas (180, 181, 182, and 183) of the partitions belonging to their respective aggregates: P1 (153), P2 (154), P3(157) and P4 (158). In this example, aggregator A2 finds the EBR_PRESENT flag set in the LVM data area (183) of partition P4 (158), so A2 sets the EBR_PRESENT flag (185) in the LVM data area (190) of its aggregate (156). Once aggregators A1 and A2 have completed their search for the EBR_PRESENT flag, the next layer of aggregators has its turn. In the example, the next level of aggregation consists of aggregator A3, which would then check the LVM data areas of A1 and A2 for the EBR_PRESENT flag. As the LVM data area of A2 (190) has the EBR_PRESENT flag (185) set, A3 sets the EBR_PRESENT flag (186) in its LVM data area (191). As there are no other layers of aggregation, the process is complete and a path from the topmost aggregator A3 to the partition containing the fake EBR (P4) is now known and marked. In FIG. 6, the dashed lines show the propagation of the EBR_PRESENT flag from P4 (158) to A3 (151).

An I/O request (169) to the EBR associated with logical volume LV1 (150) must be redirected to the fake EBR residing in the LVM data area (183) of partition P4 (158). It is the job of the topmost aggregator in the volume to detect that the I/O request is destined for the EBR and to then redirect it to the fake EBR. Accordingly, A3 (151) in the example will detect that the I/O request (169) is to the EBR, at which point it will mark the I/O request as an EBR I/O request. Next, A3 will search its children for the child that has the EBR_PRESENT flag set (A2). Once found, A3 will forward the I/O request to A2. The aggregator associated with A2 will see the I/O request passed to it is marked as an EBR I/O request, at which point it will search its children to see which one has the EBR_PRESENT flag set. Seeing that P4 (158) has the EBR_PRESENT flag set in its LVM data area (183), A2 will direct the I/O request to P4 (158). P4, being a partition, will perform the actual I/O operation. Since the I/O request received by P4 is marked as an EBR I/O request, P4 will perform that I/O request on the fake EBR located in its LVM data area. The path taken by the I/O request as it decends through the multiple layers of the volume LV1 (150) is represented by the solid arrows in FIG. 6. Thus, at each aggregation layer in the volume, the I/O request is directly handled by the aggregator which already knows that its aggregate contains the LVM data area with the fake EBR. This avoids the duplicated parallel actions and processing of the broadcast method descibed in the related application. Thus, this method is more suitable for use in systems which place high demands on access to the LVM data area and fake EBR.

Summary

Methods and systems to realize a multi-layer logical volume manager for a computer system have been described and set forth in both general terms applicable to concepts and methodoligies useful for LVM's of many operating systems, and in particular terms applicable to IBM's OS/2 operating system.

It will be understood by those skilled in the relevant arts and from the foregoing description that various modifications and changes may be made in the preferred embodiment of the present invention without departing from its true spirit and scope, such as the use of alternate computer platforms, operating systems and disk storage means. It is intended that this description is for purposes of illustration only and should not be construed in a limiting sense. The scope of this invention should be limited only by the language of the following claims.

What is claimed is:

1. A method for handling input/output ("I/O") requests and transactions to multiple-layer aggregated logical volumes of computer-readable media in a computer system, said logical volumes having a plurality of computer-readable media partitions aggregated into a single computer-readable entity by one or more aggregators, and said logical volume containing a fake extended boot record ("EBR") for describing the construct of the logical volume, said fake EBR being stored in a partition of the logical volume, the method comprising the steps of:

provided a logical volume manager function executable by said computer system;

creating a plurality of logical volume manager ("LVM") data areas within said multiple-layer logical volume, each said partition containing an LVM data area and each said aggregator having an LVM data area;

setting a first EBR present flag in the LVM data area corresponding to the partition in which said fake EBR is stored;

setting a second EBR present flag in the LVM data area corresponding to the aggregator for the partition in which the first EBR present flag was found; and setting additional EBR present flags in the LVM data areas corresponding to the aggregators for the aggregator in which the second EBR present flag is set until the topmost aggregator is reached such that the partition containing the LVM data area having the first EBR present flag may be quickly and efficiently found by following the path of EBR present flags set in the LVM data areas of the aggregators which aggregate the partition.

2. The method for handling input/output ("I/O") requests and transactions to multiple-layer aggregated logical volumes of computer-readable media as set forth in claim 1 further comprising the steps of:

creating a fake EBR stored within the partition indicated by the first EBR present flag, said fake EBR containing indicators compatible with standard computer system disk utility functions, said indicators containing a indication of multiple layer logical volume construction for the logical volume; and re-directing I/O requests for said multiple layer logical volume so as to access the fake EBR, such that standard computer system disk utilities attempting to access the multiple layer logical volume will access the fake EBR.

3. The method for handling input/output ("I/O") requests and transactions to multiple-layer aggregated logical volumes of computer-readable media as set forth in claim 1 wherein said step of providing a logical volume manager function executable by said computer system comprises providing an OS/2 logical volume manager function.

4. The method for handling input/output ("I/O") requests and transactions to multiple-layer aggregated logical volumes of computer-readable media as set forth in claim 1 wherein said step of providing a logical volume manager function executable by said computer system comprises providing a Linux logical volume manager function.

5. The method for handling input/output ("I/O") requests and transactions to multiple-layer aggregated logical volumes of computer-readable media as set forth in claim 1 wherein said step of providing a logical volume manager function executable by said computer system comprises providing a Microsoft Windows compatible logical volume manager function.

6. The method for handling input/output ("I/O") requests and transactions to multiple-layer aggregated logical volumes of computer-readable media as set forth in claim 1 wherein said step of providing a logical volume manager function executable by said computer system comprises providing a Unix compatible logical volume manager function.

7. The method for handling input/output ("I/O") requests and transactions to multiple-layer aggregated logical volumes of computer-readable media as set forth in claim 1 wherein said step of providing a logical volume manager function executable by said computer system comprises providing an AIX compatible logical volume manager function.

8. The method for handling input/output ("I/O") requests and transactions to multiple-layer aggregated logical volumes of computer-readable media as set forth in claim 1 wherein said step of providing a logical volume manager function executable by said computer system comprises providing a Sun Microsystems Solaris compatible logical volume manager function.

9. A computer-readable storage medium having stored therein computer-readable program code for handling input/output ("I/O") requests and transactions to multiple-layer aggregated logical volumes of computer-readable media in a computer system, said logical volumes having a plurality of computer-readable media partitions aggregated into a single computer-readable entity by one or more aggregators, and said logical volume containing an extended boot record ("EBR") for describing the construct of the logical volume, said EBR being stored in a partition of the logical volume, wherein the program code when executed by the processor causes the processor to perform the steps of:

providing a logical volume manager function responsive to I/O requests to said multiple layer logical volume;

creating a plurality of logical volume manager ("LVM") data areas within said multiple-layer logical volume, each said partition containing an LVM data area and each said aggregator having an LVM data area;

setting a first EBR present flag in the LVM data area corresponding to the partition in which said EBR is stored;

setting a second EBR present flag in the LVM data area corresponding to the aggregator for the partition in which the first EBR present flag was found;

setting additional EBR present flags in the LVM data areas corresponding to the aggregators for the aggregator in which the second EBR present flag is set until the topmost aggregator is reached such that the partition containing the LVM data area having the first EBR present flag may be quickly and efficiently found by following the path of EBR present flags set in the LVM data areas of the aggregators which aggregate the partition.

10. A computer-readable storage medium having stored therein computer-readable program code as set forth in claim 9, further comprising program code when executed by the processor causes the processor to perform the steps of:

creating a fake EBR stored within the partition indicated by the first EBR present flag, said fake EBR containing indicators compatible with standard computer system disk utility functions, said indicators containing a indication of multiple layer logical volume construction for the logical volume; and re-directing I/O requests for said multiple layer logical volume so as to access the fake EBR, such that standard computer system disk utilities attempting to access the multiple layer logical volume will access the fake EBR.

11. The computer-readable storage medium as set forth in claim 9 wherein said logical volume manager function program code comprises an OS/2 logical volume manager function.

12. The computer-readable storage medium as set forth in claim 9 wherein said logical volume manager function program code comprises a Linux logical volume manager function.

13. The computer-readable storage medium as set forth in claim 9 wherein said logical volume manager function program code comprises a Microsoft Windows compatible logical volume manager function.

14. The computer-readable storage medium as set forth in claim 9 wherein said logical volume manager function program code comprises a Unix compatible logical volume manager function.

15. The computer-readable storage medium as set forth in claim 9 wherein said logical volume manager function program code comprises an AIX compatible logical volume manager function.

16. The computer-readable storage medium as set forth in claim 9 wherein said logical volume manager function program code comprises a Sun Microsystems Solaris compatible logical volume manager function.

17. A system for creating and managing multiple layer aggregation logical volumes of computer-readable media in a computer, said logical volumes comprising a plurality of computer-readable partitions and a plurality of partition aggregators, said computer having a said system comprising:

at least one computer-readable media device having at least one processor capable of executing computer software, said computer being interfaced to at least one computer readable media device or devices computer-readable media partition, said system comprising:

a multi-layer logical volume manager which allows multiple layers of aggregations of said computer-readable media partitions by multiple aggregators to be combined logically accessible as a single entity by said computer processor and software being executed by said computer processor;

a plurality of logical volume management ("LVM") data areas, one each disposed in each partition of said multi-layer logical volume, and one each associated with each aggregator of said multi-layer logical volume;

a fake extended boot record ("EBR") disposed in one of said partitions, said fake EBR containing indicators compatible with standard computer system disk utility functions, said indicators containing a indication of multiple layer logical volume construction for the logical volume;

a plurality of flags disposed in LVM data areas associated with the partition containing the fake EBR and disposed in each LVM data area associated with each aggregator of said partition such that the location of the fake EBR may be quickly and efficiently found by searching said LVM data areas for said flags, and traversing a path formed by said flags from topmost aggregator to the partition in which the fake EBR is stored.

18. The system for creating and managing multiple layer aggregation logical volumes of computer-readable media in a computer as set forth in claim 17 further comprising and I/O request re-director responsive to computer I/O requests to said multiple layer logical volume so as to access the fake EBR upon such requests, thereby allowing standard computer system disk utilities attempting to access the multiple layer logical volume to access the fake EBR.

19. A system for creating and managing logical volumes of computer-readable media as set forth in claim 17 wherein said multi-layer logical volume manager aggregators further comprise a Redundant Array of Independent Disks ("RAID") array of computer-readable media.

20. A system for creating and managing logical volumes of computer-readable media as set forth in claim 17 wherein said multi-layer logical volume manager aggregators further comprise a disk mirroring subsystem.

21. A system for creating and managing logical volumes of computer-readable media as set forth in claim 17 wherein said multi-layer logical volume manager aggregators further comprise a drive linking subsystem.

22. A system for creating and managing logical volumes of computer-readable media as set forth in claim 17 wherein said multi-layer logical volume manager comprises an enhanced IBM OS/2 LVM.

23. A system for creating and managing logical volumes of computer-readable media as set forth in claim 17 wherein said multi-layer logical volume manager comprises a Linux LVM.

24. A system for creating and managing logical volumes of computer-readable media as set forth in claim 17 wherein said multi-layer logical volume manager comprises an Microsoft Windows compatible LVM.

25. A system for creating and managing logical volumes of computer-readable media as set forth in claim 17 wherein said multi-layer logical volume manager comprises a Unix compatible LVM.

26. A system for creating and managing logical volumes of computer-readable media as set forth in claim 17 wherein said multi-layer logical volume manager comprises an enhanced IBM AIX LVM.

27. A system for creating and managing logical volumes of computer-readable media as set forth in claim 17 wherein said multi-layer logical volume manager comprises a Sun Microsystems Solaris LVM.

* * * * *